(12) United States Patent
Takahashi et al.

(10) Patent No.: US 11,204,606 B2
(45) Date of Patent: Dec. 21, 2021

(54) VEHICLE CONTROL DEVICE

(71) Applicant: HONDA MOTOR CO., LTD., Tokyo (JP)

(72) Inventors: Kazuyuki Takahashi, Wako (JP); Daichi Kato, Wako (JP); Hiroshi Oguro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 16/342,740

(22) PCT Filed: Oct. 18, 2016

(86) PCT No.: PCT/JP2016/080782
§ 371 (c)(1),
(2) Date: Apr. 17, 2019

(87) PCT Pub. No.: WO2018/073885
PCT Pub. Date: Apr. 26, 2018

(65) Prior Publication Data
US 2019/0235509 A1 Aug. 1, 2019

(51) Int. Cl.
*G05D 1/02* (2020.01)
*G05D 1/00* (2006.01)
(Continued)

(52) U.S. Cl.
CPC ......... *G05D 1/0212* (2013.01); *B60W 30/095* (2013.01); *G05D 1/0088* (2013.01);
(Continued)

(58) Field of Classification Search
CPC . G05D 1/0212; G05D 1/0088; B60W 30/095; B60W 30/085; B60W 30/02; B60W 30/08; B60W 30/10
See application file for complete search history.

(56) References Cited

U.S. PATENT DOCUMENTS

| | | | |
|---|---|---|---|
| 7,865,277 B1 * | 1/2011 | Larson | G05D 1/0206 701/23 |
| 11,126,187 B2 * | 9/2021 | McGill, Jr. | G05D 1/0231 |

(Continued)

FOREIGN PATENT DOCUMENTS

| | | | | |
|---|---|---|---|---|
| CN | 109791736 A | * | 5/2019 | B60W 30/12 |
| JP | 2010-250772 A | | 11/2010 | |

(Continued)

OTHER PUBLICATIONS

PCT/ISA/210 from International application PCT/JP2016/080782 and the English translation thereof.

*Primary Examiner* — Hunter B Lonsberry
*Assistant Examiner* — Jay Khandpur
(74) *Attorney, Agent, or Firm* — Carrier Blackman & Associates, P.C.; Joseph P. Carrier; Fulchand P. Shende

(57) ABSTRACT

In the present invention, an integrated control unit simultaneously causes a long-term route generation unit, an intermediate-term route generation unit, and a short-term route generation unit to begin generating routes when an automatic driving mode is set to an on state by an automatic driving on setting unit, and a vehicle is instantly subjected to automatic driving control using a short-term route prior to the generation of a long-term route. As a result, the present invention provides a vehicle control device that can immediately perform automatic driving control based on a short-term route after the automatic driving mode of the vehicle is set to the on state and, after generating a long-term route in which riding comfort improves a stepwise manner, perform automatic driving control in which the long-term route and an intermediate-term route are taken into account.

4 Claims, 12 Drawing Sheets

(51) Int. Cl.
*B60W 30/095* (2012.01)
*B60W 30/02* (2012.01)
*B60W 30/08* (2012.01)
*B60W 30/10* (2006.01)
*B60W 30/085* (2012.01)

(52) U.S. Cl.
CPC ............. *B60W 30/02* (2013.01); *B60W 30/08* (2013.01); *B60W 30/085* (2013.01); *B60W 30/10* (2013.01)

(56) References Cited

U.S. PATENT DOCUMENTS

| | | | |
|---|---|---|---|
| 2010/0082195 A1* | 4/2010 | Lee | G01C 21/12 701/25 |
| 2015/0224987 A1* | 8/2015 | Tachibana | G08G 1/166 701/1 |
| 2016/0362116 A1* | 12/2016 | Otsuka | B60W 50/0098 |
| 2017/0075359 A1* | 3/2017 | Wang | G05D 1/0676 |

FOREIGN PATENT DOCUMENTS

| | | | | |
|---|---|---|---|---|
| JP | | 5306934 B2 | 10/2013 | |
| WO | WO-2018066024 A1 * | | 4/2018 | ........... G05D 1/0217 |

* cited by examiner

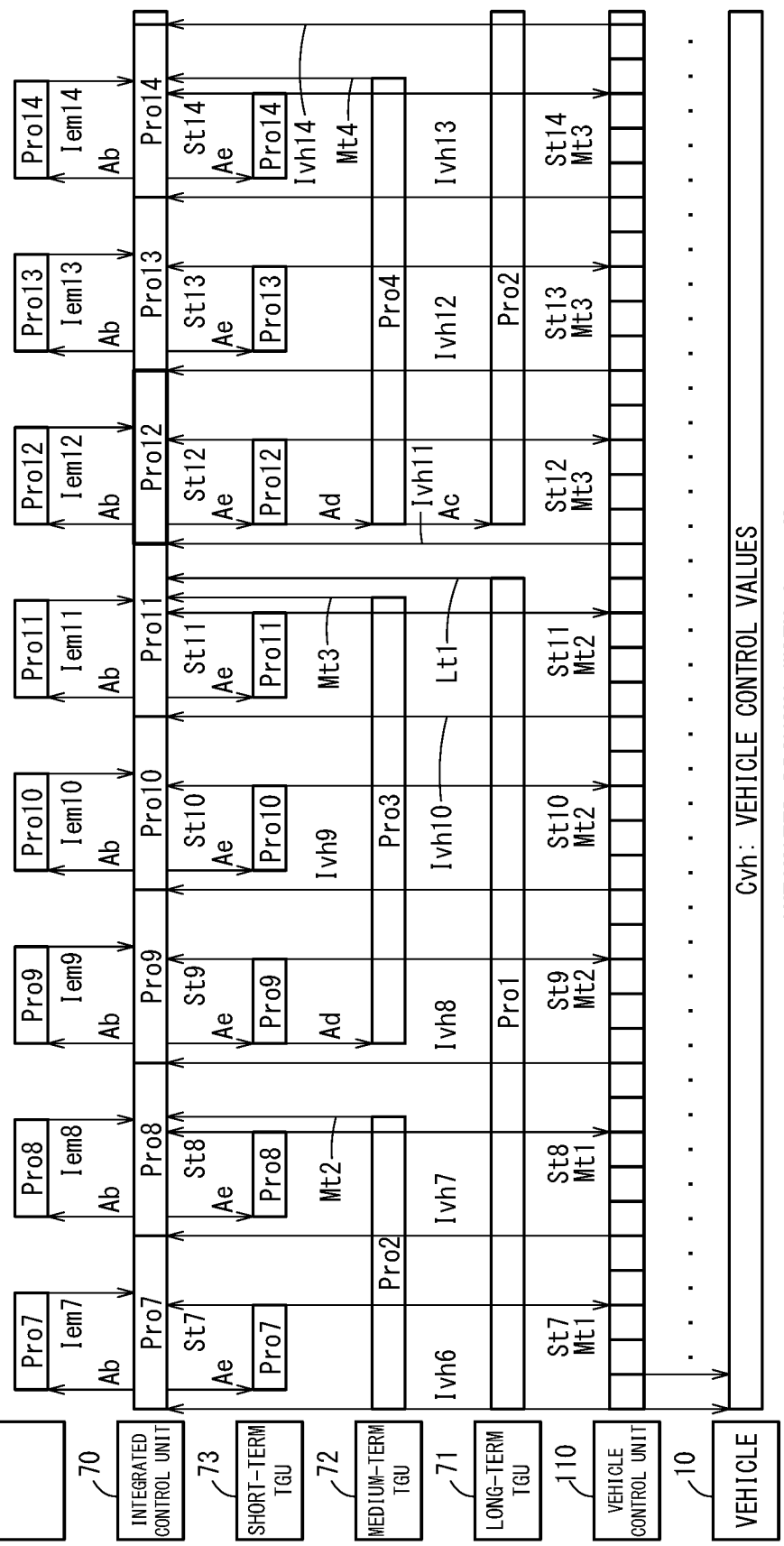

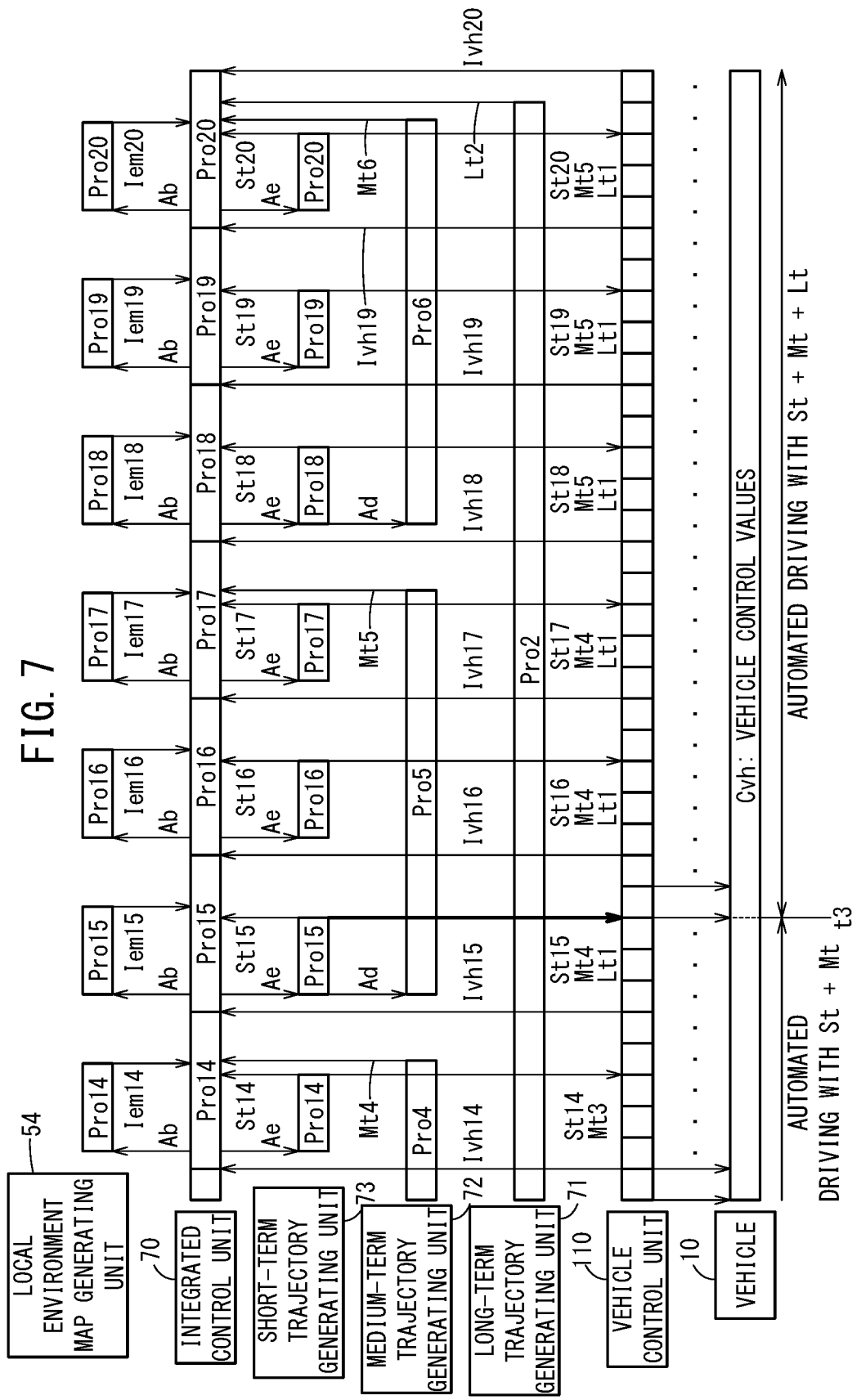

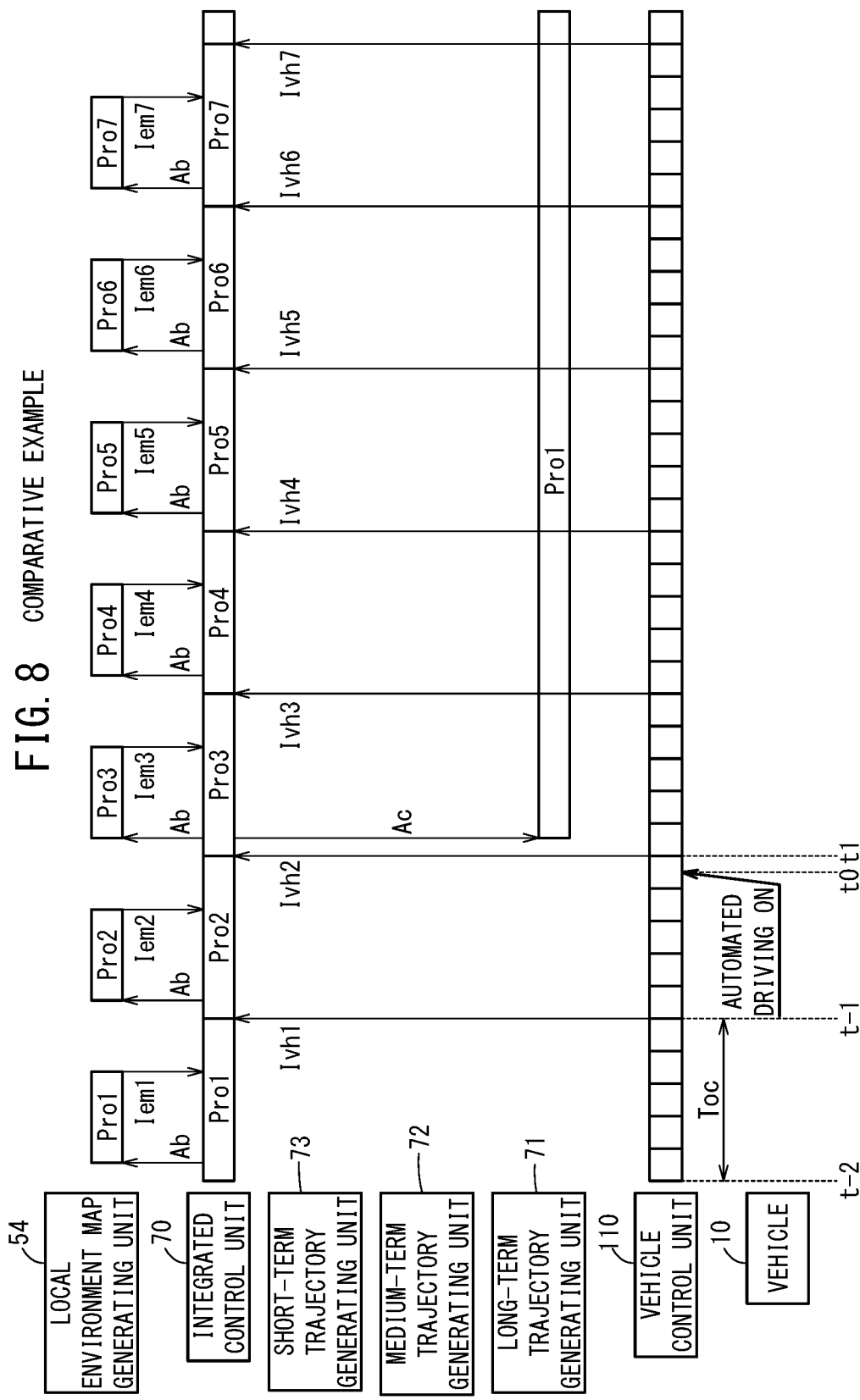

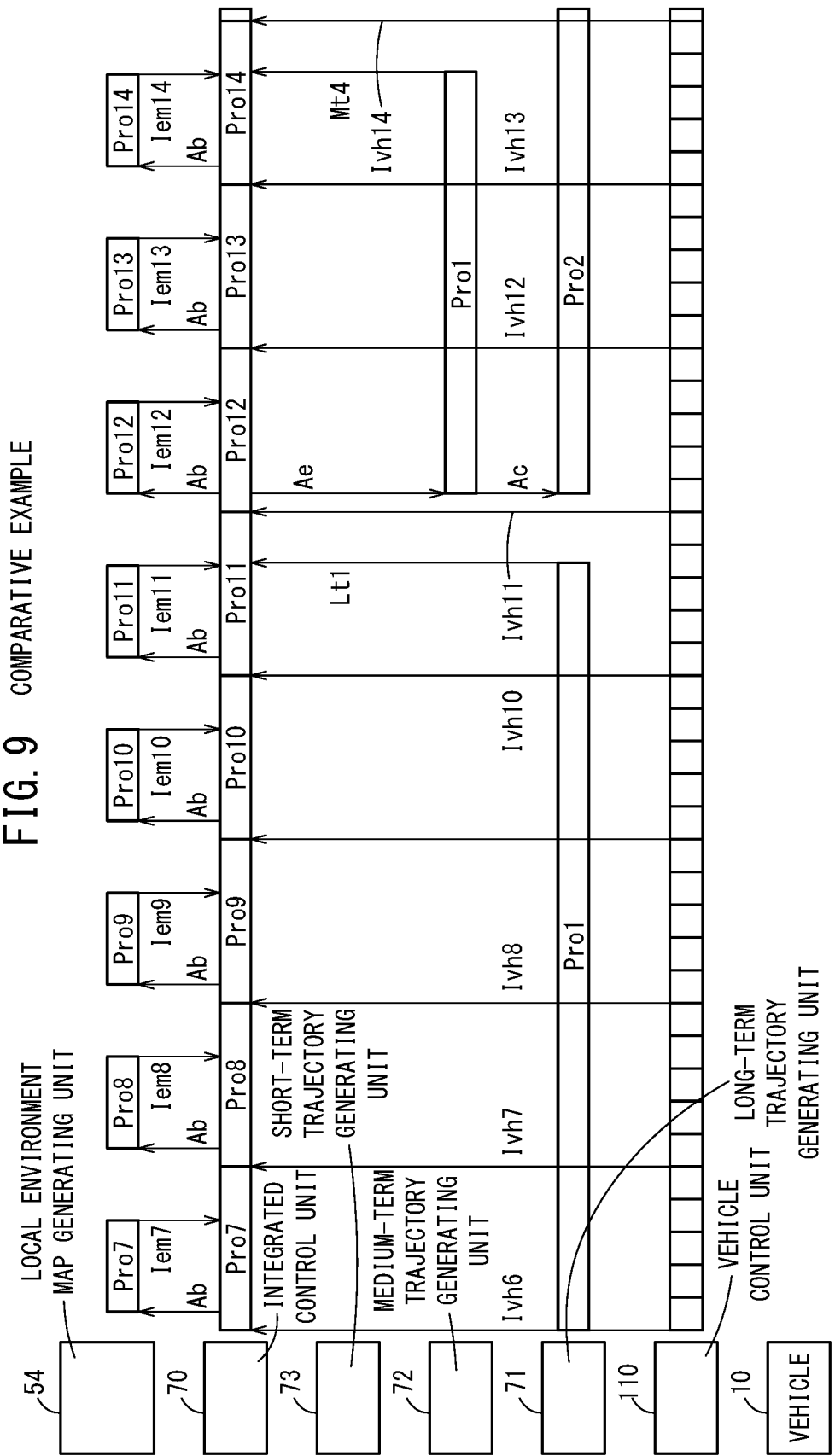
FIG. 9 COMPARATIVE EXAMPLE

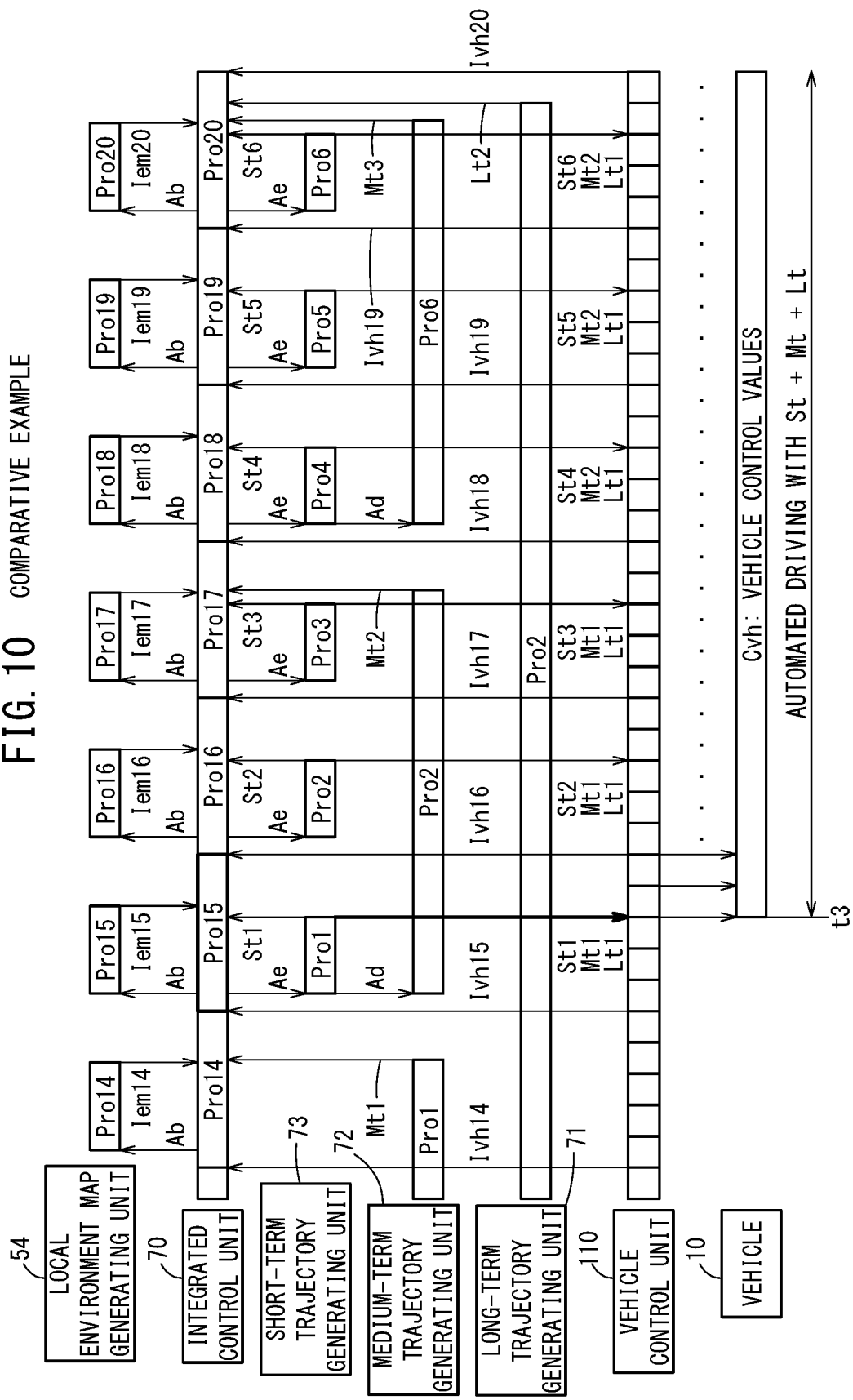
FIG. 10 COMPARATIVE EXAMPLE

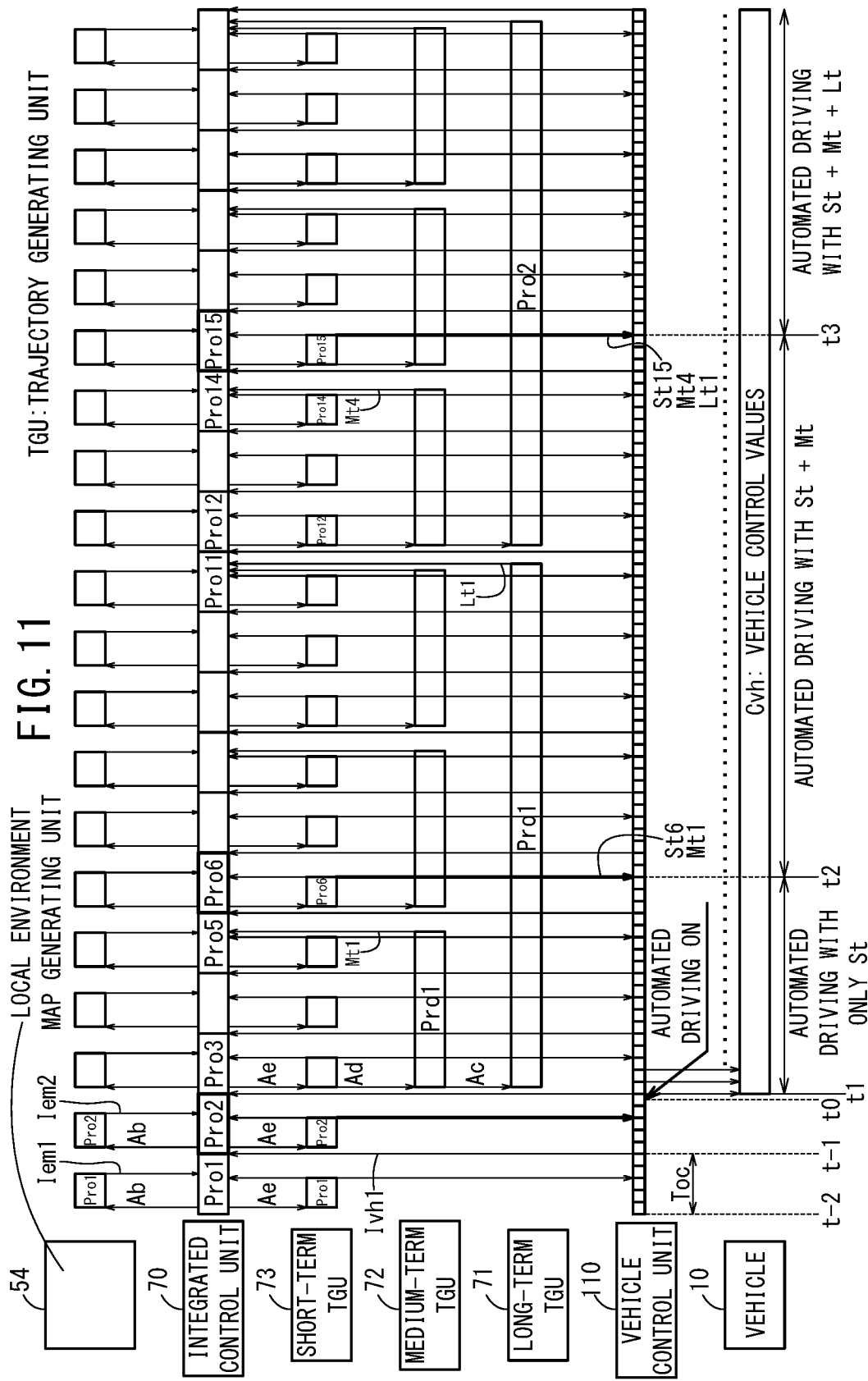

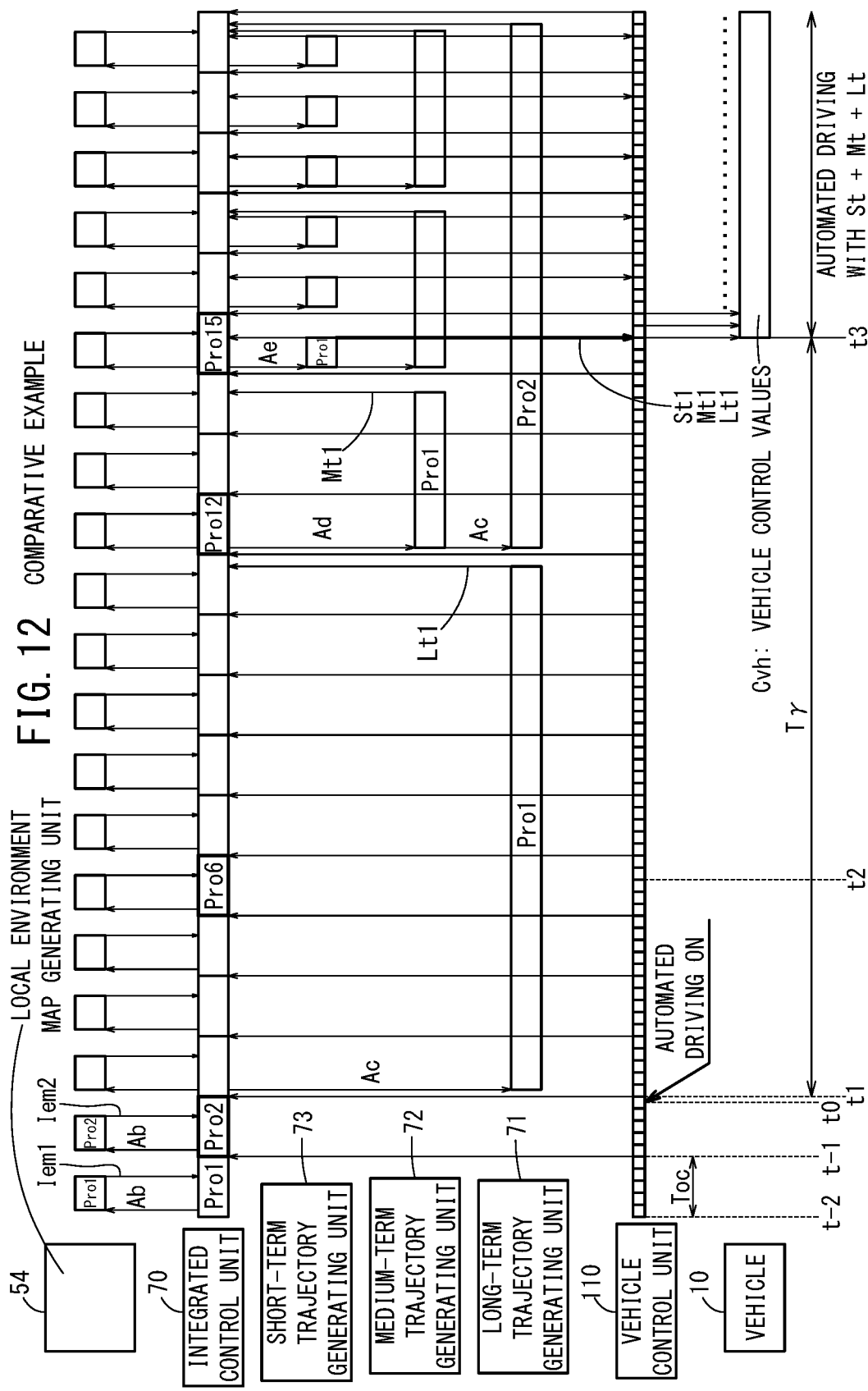
FIG. 12 COMPARATIVE EXAMPLE

VEHICLE CONTROL DEVICE

TECHNICAL FIELD

The present invention relates to a vehicle control device suitable for being applied to a vehicle that is capable of being driven automatically (including an automated driving assist).

BACKGROUND ART

In Japanese Patent No. 5306934 (hereinafter referred to as JP5306934B), a control system is disclosed which, in order to generate a plurality of action objectives, is equipped with a plurality of modules (referred to as action objective generation modules) which are hierarchized in accordance with a length of operation cycles thereof, and wherein a control object is controlled through a control module in accordance with calculation results of the plurality of action objective generation modules. A specific control object that is controlled by such a control system is a leg type robot.

JP5306934B includes the action objective generation modules which are divided into three layers in accordance with the operation cycle, and the action objective generation module having the longest operation cycle is placed in charge of moving the robot to the target position, the action objective generation module having an intermediate operation cycle is placed in charge of causing the robot to avoid contact with objects, and the action objective generation module having a short operation cycle is placed in charge of stabilizing the posture of the robot.

In such a hierarchical control system, a configuration is provided in which behaviors of the control object are controlled in a manner so that evaluation results produced by an action objection generation module having a shorter operation cycle are preferentially reflected more so than the evaluation results produced by an action objective generation module having a longer operation cycle (see claim 1 of JP5306934B).

SUMMARY OF INVENTION

Incidentally, in a vehicle capable of being driven automatically (including an automated driving assist), it is a matter of course that the vehicle is made to reach a target position by traveling on a road while satisfying conditions of adaptability and responsiveness with respect to the recognized travel environment in the immediate vicinity, and emphasis is placed on the comfortableness and riding comfort of the vehicle occupants, for example, the smoothness of changes in behavior of the vehicle, which is similar to that of an exemplary driver.

However, according to JP5306934B, as a result of being concerned with a legged robot or the like, since a configuration is provided in which behaviors of the legged robot are controlled momentarily from time to time in a manner in which the evaluation results by an action objection generation module having a shorter operation cycle are reflected in a preferential manner, and the robot is made to reach the target position, there is room for improvement in relation to enhancing the smoothness of changes in behavior of the control object (riding comfort of occupants).

The present invention has been devised taking into consideration the aforementioned problem, and has the object of providing a vehicle control device that can be appropriately applied to a trajectory generation process of an automatically driven vehicle (including a vehicle in which an automated driving assist is implemented).

A vehicle control device according to the present invention is characterized by a vehicle control device that controls a vehicle configured to be driven automatically, comprising a long-term trajectory generating unit configured to generate, on a basis of external environmental information, a long-term trajectory having a long period whose operation cycle is relatively long, a short-term trajectory generating unit configured to generate a short-term trajectory in consideration of the generated long-term trajectory, and having a short period which is shorter than the long period, and an integrated control unit configured to control the long-term trajectory generating unit and the short-term trajectory generating unit, wherein, when performing automated driving, the integrated control unit is simultaneously configured to initiate generation of trajectories in the long-term trajectory generating unit and the short-term trajectory generating unit, while configured to control the vehicle in accordance with the short-term trajectory before the long-term trajectory is generated.

According to the present invention, when automated driving is implemented, the integrated control unit simultaneously initiates generation of trajectories in the long-term trajectory generating unit and the short-term trajectory generating unit, while on the other hand, controls the vehicle in accordance with the short-term trajectory before the long-term trajectory is generated. In this manner, since the vehicle is controlled in accordance with the short-term trajectory before the long-term trajectory is generated, when automated driving is implemented, the vehicle can be immediately controlled. In addition, since generation of trajectories is simultaneously initiated in the long-term trajectory generating unit and the short-term trajectory generating unit, the time until the lower order short-term trajectory is generated in consideration of the higher order long-term trajectory can be made shorter.

In general, riding comfort is emphasized in the long-term trajectory, and adaptability and responsiveness to the recognized external environment are emphasized in the short-term trajectory. Therefore, while ensuring adaptability and responsiveness to the external environment, after the elapse of a predetermined period, it is possible to perform automated driving in further consideration of riding comfort (comfortableness).

Thus, the vehicle control device according to the present invention can be appropriately applied to a trajectory generation process of an automatically driven vehicle (including a vehicle in which an automated driving assist is implemented).

In this case, the external environment recognition information may include static information whose state does not change, and dynamic information whose state changes, the long-term trajectory generating unit may be configured to generate the long-term trajectory using the static information, and the short-term trajectory generating unit may be configured to generate the short-term trajectory using the static information and the dynamic information.

In this manner, since the lower order short-term trajectory generating unit generates the short-term trajectory in a short period using the static information whose state does not change and the dynamic information whose state changes, the vehicle can be controlled immediately, and further, after the long-term trajectory is generated in the long-term trajectory generating unit, the short-term trajectory generating unit generates the short-term trajectory in consideration of the long-term trajectory. Therefore, the vehicle can be controlled immediately based on the dynamic information, and after the long-term trajectory is generated based on the static information, it is possible to implement automated driving in which the level of comfort is higher, and in which the occurrence of precipitous or sudden vehicle behaviors is suppressed.

More specifically, the long-term trajectory is a trajectory in which emphasis is placed on riding comfort, and the short-term trajectory is a trajectory in which emphasis is placed on responsiveness with respect to the external environment.

Thus, after the long-term trajectory is generated, automated driving in which the riding comfort (comfortability) is high can be implemented while maintaining adaptability and responsiveness with respect to the environment.

Further, the short-term trajectory generating unit, in addition to the short-term trajectory generating unit, is divided into a medium-term trajectory generating unit configured to generate a medium-term trajectory having a medium period that is relatively longer than the short period and relatively shorter than the long period, and when performing automated driving, the integrated control unit is simultaneously configured to initiate generation of respective trajectories in the long-term trajectory generating unit, the short-term trajectory generating unit, and the medium-term trajectory generating unit, while configured to control the vehicle in accordance with the short-term trajectory before the medium-term trajectory is generated, and when the medium-term trajectory is generated, configured to control the vehicle in accordance with the short-term trajectory with reference to the medium-term trajectory, and when the long-term trajectory is generated, configured to generate the short-term trajectory with reference to the medium-term trajectory that was generated with reference to the long-term trajectory, and configured to control the vehicle in accordance with the short-term trajectory.

In this manner, when automated driving is implemented, at first, the vehicle is controlled in accordance with the short-term trajectory that was generated by the short-term trajectory generating unit having the shortest operation cycle, next, the vehicle is controlled with a short-term trajectory made with reference to the medium-term trajectory that was generated by the medium-term trajectory generating unit having the next shortest operation cycle, and next, the vehicle is controlled with a short-term trajectory made with reference to the medium-term trajectory that was generated with reference to the long-term trajectory that was generated by the long-term trajectory generating unit having the longest operation cycle. Therefore, automated driving can be started immediately, and a transition can be made gradually (in a stepwise manner) to automated driving which is implemented in consideration of riding comfort (comfortableness).

BRIEF DESCRIPTION OF DRAWINGS

FIG. 6 is a time chart (two of three) provided to explain operations of the vehicle control device according to the present embodiment;

FIG. 7 is a time chart (three of three) provided to explain operations of the vehicle control device according to the present embodiment;

FIG. 8 is a time chart (one of three) provided to explain operations of the vehicle control device according to a comparative example;

FIG. 9 is a time chart (two of three) provided to explain operations of the vehicle control device according to the comparative example;

FIG. 10 is a time chart (three of three) provided to explain operations of the vehicle control device according to the comparative example;

FIG. 11 is a time chart provided to explain operations of the vehicle control device according to the present embodiment, in which the time charts of FIGS. 5 to 7 are drawn collectively; and FIG. 12 is a time chart provided to explain operations of the vehicle control device according to the comparative example, in which the time charts of FIGS. 8 to 10 are drawn collectively.

DESCRIPTION OF EMBODIMENTS

A preferred embodiment of a vehicle control device according to the present invention will be presented and described below with reference to the accompanying drawings, in relation to a vehicle in which the vehicle control device is installed.

[Configuration of Vehicle 10]

Figure 1:
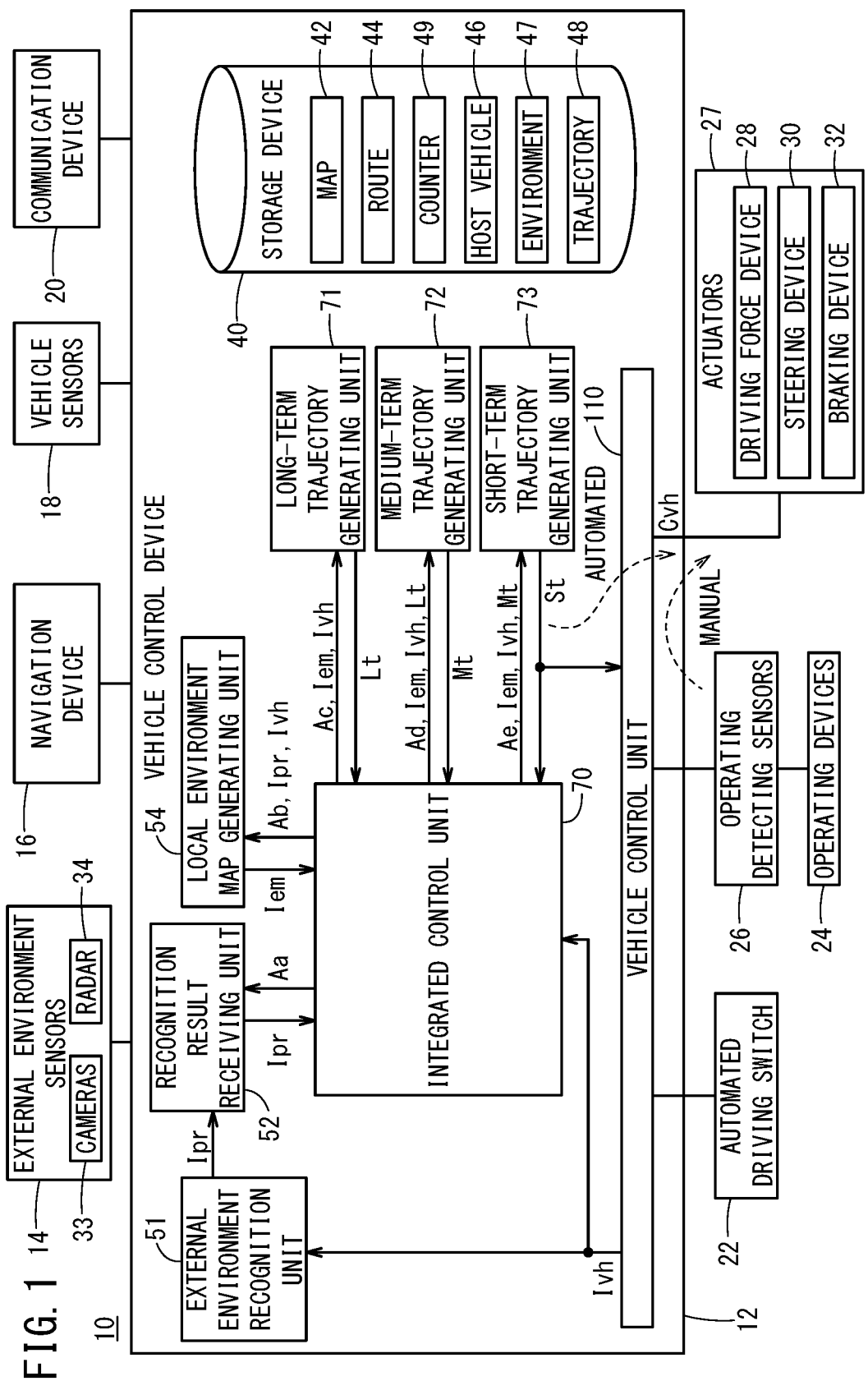
FIG. 1 is a schematic configuration block diagram of a vehicle equipped with a vehicle control device according to a present embodiment.

FIG. 1 is a schematic configuration block diagram of a vehicle 10 (also referred to as a "host vehicle" or a "driver's own vehicle") equipped with a vehicle control device 12 according to a present embodiment.

The vehicle 10 includes the vehicle control device 12, and in addition to the vehicle control device 12, is equipped with input devices and output devices which are connected via communication lines to the vehicle control device 12.

As the input devices, there are provided external environment sensors 14, a navigation device 16, vehicle sensors 18, a communication device 20, an automated driving switch (automated driving SW) 22, and operation detecting sensors 26 connected to operating devices 24.

As the output devices, there are provided actuators 27 including a driving force device 28 for driving the vehicle wheels (not shown), a steering device 30 for steering the vehicle wheels, and a braking device 32 for braking the vehicle wheels. Moreover, the navigation device 16 and the communication device 20 can also be used as input/output devices (human interface, transceiver).

[Configuration of Input/Output Devices Connected to Vehicle Control Device 12]

The external environment sensors 14 include a plurality of cameras 33 and a plurality of radar devices 34 which acquire information indicative of the external environment (360° around the front, rear, and sides, etc.) of the vehicle 10, and output the acquired external environmental information of the vehicle 10 to the vehicle control device 12. The external environment sensors 14 may further be equipped with a plurality of LIDAR (Light Detection and Ranging; Laser Imaging Detection and Ranging) devices.

The navigation device 16 detects and specifies a current position of the vehicle 10 using a satellite positioning device or the like, together with including a touch panel display, a speaker, and a microphone as a user interface, and further, calculates a route to a designated destination from the current position or a position designated by the user, and outputs the calculated route to the vehicle control device 12. The route calculated by the navigation device 16 is stored as route information in a route information storage unit 44 of a storage device 40.

The vehicle sensors 18 output to the vehicle control device 12 detection signals from respective sensors, including a speed (vehicle speed) sensor for detecting the speed (vehicle speed), an acceleration sensor for detecting an acceleration, and a lateral G sensor for detecting a lateral G force of the vehicle 10, a yaw rate sensor for detecting an angular speed about a vertical axis of the vehicle 10, an orientation sensor for detecting an orientation of the vehicle 10, and a gradient sensor for detecting a gradient of the vehicle 10. At each of respective operation cycles Toc, to be described later, the detection signals are stored as host vehicle state information Ivh of the host vehicle in a host vehicle state information storage unit 46 of the storage device 40.

The communication device 20 communicates with roadside devices, other vehicles, and a server, etc., and receives or transmits information related to traffic signals, etc., information related to the other vehicles, as well as probe information and updated map information or the like. In addition to being stored in the navigation device 16, the map information is stored as map information in a map information storage unit 42 of the storage device 40.

The operating devices 24 include an accelerator pedal, a steering wheel (handle), a brake pedal, a shift lever, and a direction indicating (turn signal) lever, and the like. The operation detecting sensors 26, which detect the presence or absence or the operated amounts of operations made by the driver, as well as operated positions, are attached to the operating devices 24.

The operation detecting sensors 26 output to a vehicle control unit 110 as detection results an amount by which the accelerator is depressed (degree of accelerator opening), an amount (steering amount) at which the steering wheel is operated, an amount by which the brake pedal is depressed, a shift position, and a right or left turn direction, etc.

The automated driving switch 22 (automated driving ON setting unit), for example, is a pushbutton switch provided on the instrument panel, and is operated manually by a user such as a driver or the like in order to switch between a non-automated driving mode (manual driving mode) and an automated driving mode.

According to the present embodiment, the automated driving mode and the non-automated driving mode are set each time that the pushbutton switch is pressed, however, in order to provide confirmation of a driver's intention to switch to automated driving, it is possible to provide settings in which, for example, switching from the non-automated driving mode to the automated driving mode is effected by pressing twice, and switching from the automated driving mode to the non-automated driving mode is effected by pressing once.

The automated driving mode is a driving mode in which the vehicle 10 travels under the control of the vehicle control device 12, in a state in which the driver does not operate the operating devices 24 such as the accelerator pedal, the steering wheel, and the brake pedal, and is a driving mode in which the vehicle control device 12 controls a portion or all of the driving force device 28, the steering device 30, and the braking device 32 on the basis of action plans (a short-term trajectory St, a medium-term trajectory Mt, and a long-term trajectory Lt, to be described later).

Moreover, during the automated driving mode, in the case that the driver starts to operate any of the operating devices 24 such as the accelerator pedal, the steering wheel, or the brake pedal, the automated driving mode is canceled automatically, and the system switches over to the non-automated driving mode (manual driving mode).

In this instance, even in the manual driving mode, certain driving assist functions, such as a known adaptive cruise control (ACC) function, and a lane keeping assist system (LKAS) function can be implemented.

Further, the aforementioned automated driving switch 22 may be of a touch type, a voice input type, or the like.

The driving force device 28 is constituted from a driving force ECU, and a drive source for the vehicle 10 such as an engine and/or a traction motor or the like. The driving force device 28 generates a travel driving force (torque) in order for the vehicle 10 to travel in accordance with vehicle control values Cvh input thereto from the vehicle control unit 110, and transmits the travel driving force to the vehicle wheels directly or through a transmission.

The steering device 30 is constituted from an EPS (electric power steering system) ECU, and an EPS device. The steering device 30 changes the orientation of the vehicle wheels (steered wheels) in accordance with the vehicle control values Cvh input thereto from the vehicle control unit 110.

The braking device 32, for example, is an electric servo brake used in combination with a hydraulic brake, and is made up from a brake ECU and a brake actuator.

The braking device 32 brakes the vehicle wheels in accordance with vehicle control value Cvh information input thereto from the vehicle control unit 110.

Moreover, steering of the vehicle 10 can also be performed by changing a torque distribution and/or a braking force distribution with respect to the left and right vehicle wheels.

[Configuration of Vehicle Control Device 12]

The vehicle control device 12 is constituted by one or a plurality of ECUs (electronic control units), and is equipped with the storage device 40, etc., in addition to various function realizing units. According to the present embodiment, the function realizing units are software-based functional units, in which the functions thereof are realized by a CPU (central processing unit) executing programs stored in the storage device 40. However, the functions thereof can also be realized by hardware-based functional units made up from integrated circuits or the like.

Figure 2:
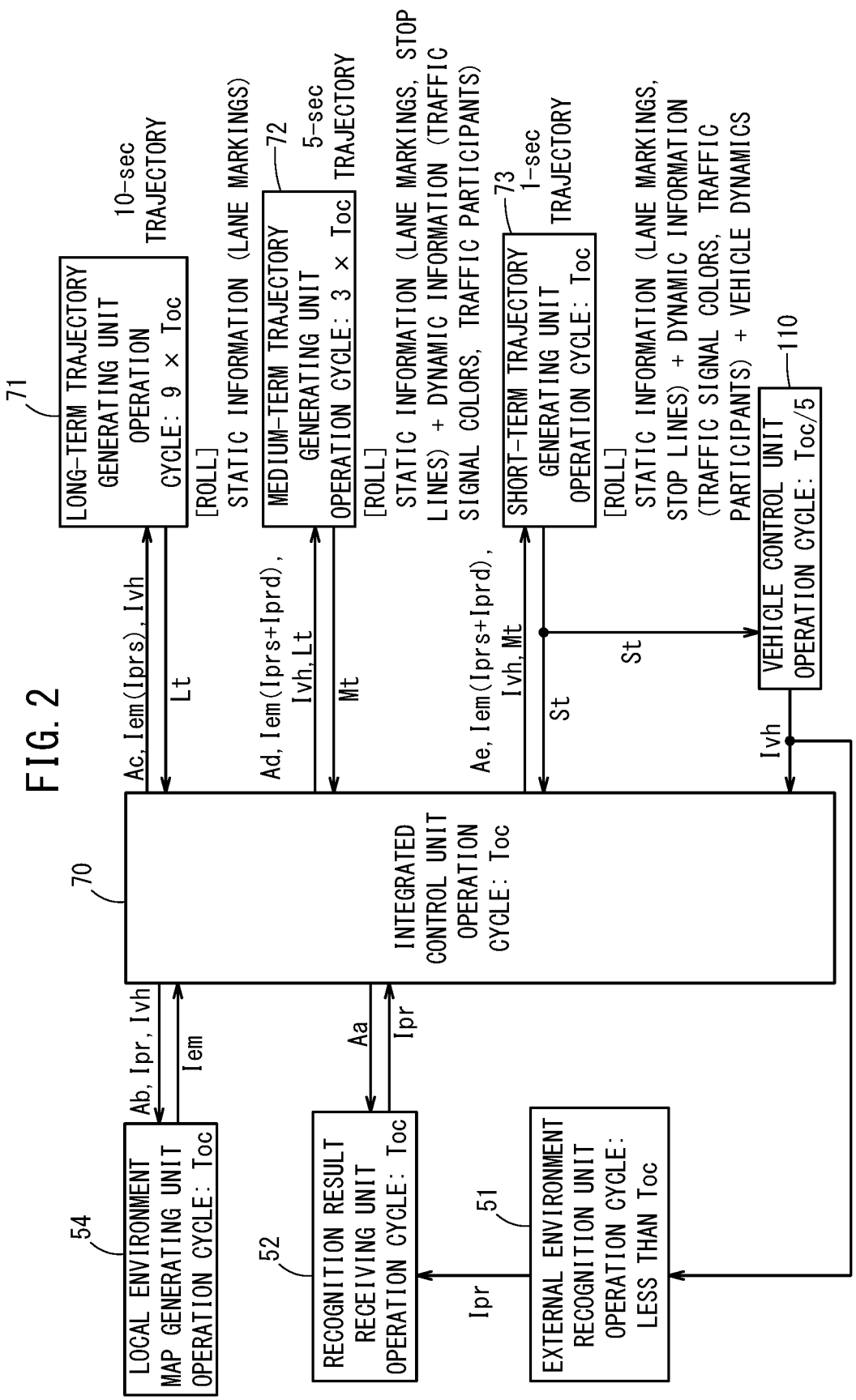
FIG. 2 is a block diagram in which the configuration of principle components appearing in FIG. 1 is extracted.

FIG. 2 is a block diagram extracted from FIG. 1 and showing the configuration of principle components of the vehicle control device 12 according to the present embodiment.

In addition to the storage device 40 (see FIG. 1) and the vehicle control unit 110 as a function realizing unit (function realizing module), the vehicle control device 12 includes an external environment recognition unit 51, a recognition result receiving unit 52, a local environment map generating unit 54, a long-term trajectory generating unit 71, a medium-term trajectory generating unit 72, a short-term trajectory generating unit 73, and an integrated control unit (task synchronization module) 70 that controls these units comprehensively together with controlling task synchronization.

In the vehicle control device 12, the external environment recognition unit 51 simultaneously generates external environment recognition information Ipr made up from static (having no change or no movement) external environment recognition information Iprs, and dynamic (in which change or movement there of is possible) external environment recognition information Iprd.

When the static external environment recognition information Iprs is generated, the external environment recognition unit 51 refers to the host vehicle state information Ivh from the vehicle control unit 110, and furthermore, from among the external environment sensors 14, on the basis of the external environmental information (image information) from the cameras 33 and the like, recognizes lane markings (white lines) on both sides of the vehicle 10, together with recognizing the distances to stop lines of intersections or the like (how many meters there are up to the stop lines) as well as recognizing travel capable regions (planar regions in which guardrails and curbsides are excluded without concern to the lane markings), and then generates the external environment recognition information Iprs, and transmits (outputs) such information to the recognition result receiving unit 52.

When the dynamic external environment recognition information Iprd is generated, the external environment recognition unit refers to the host vehicle state information Ivh, and furthermore, on the basis of the external environmental information from the cameras 33 or the like, the external environment recognition unit 51 recognizes obstacles (including parked or stopped vehicles), traffic participants (people, other vehicles), and the colors of traffic signals (blue (green), yellow (orange), red) and the like, and then generates the external environmental information Iprd, and transmits (outputs) such information to the recognition result receiving unit 52.

The external environment recognition unit 51 recognizes the external environment recognition information Ipr (Ipr=Iprs+Iprd) in a time period that is less than the operation cycle Toc, and transmits (outputs) the information to the recognition result receiving unit 52.

In this case, the recognition result receiving unit 52 updates its own update counter (not shown) in response to an operation command Aa from the integrated control unit 70, and together with the updated count value, outputs the external environment recognition information Ipr (Ipr=Iprs+Iprd) received from the external environment recognition unit 51 to the integrated control unit 70 within the operation cycle Toc.

The integrated control unit 70 stores the external environment recognition information Ipr (Ipr=Iprs+Iprd) in the storage device 40.

In this instance, the operation cycle (also referred to as a reference cycle or a reference operation cycle) Toc is a standard operation cycle in the vehicle control device 12, and is set, for example, to a value on the order of several tens of milliseconds (ms).

In response to an operation command Ab from the integrated control unit 70, the local environment map generating unit 54 refers to (aggregates) the host vehicle state information Ivh and the external environment recognition information Ipr, and inside of the operation cycle Toc, generates local environment map information Iem, and outputs the information to the integrated control unit 70 together with the count value of the update counter (not shown).

More specifically, at the start of the control, an operation cycle 2×Toc is required until the local environment map information Iem is generated.

The local environment map information Iem, in general, is information obtained by synthesizing the host vehicle state information Ivh with the external environment recognition information Ipr. The local environment map information Iem is stored in a local environment map information storage unit 47 of the storage device 40.

Figure 3:
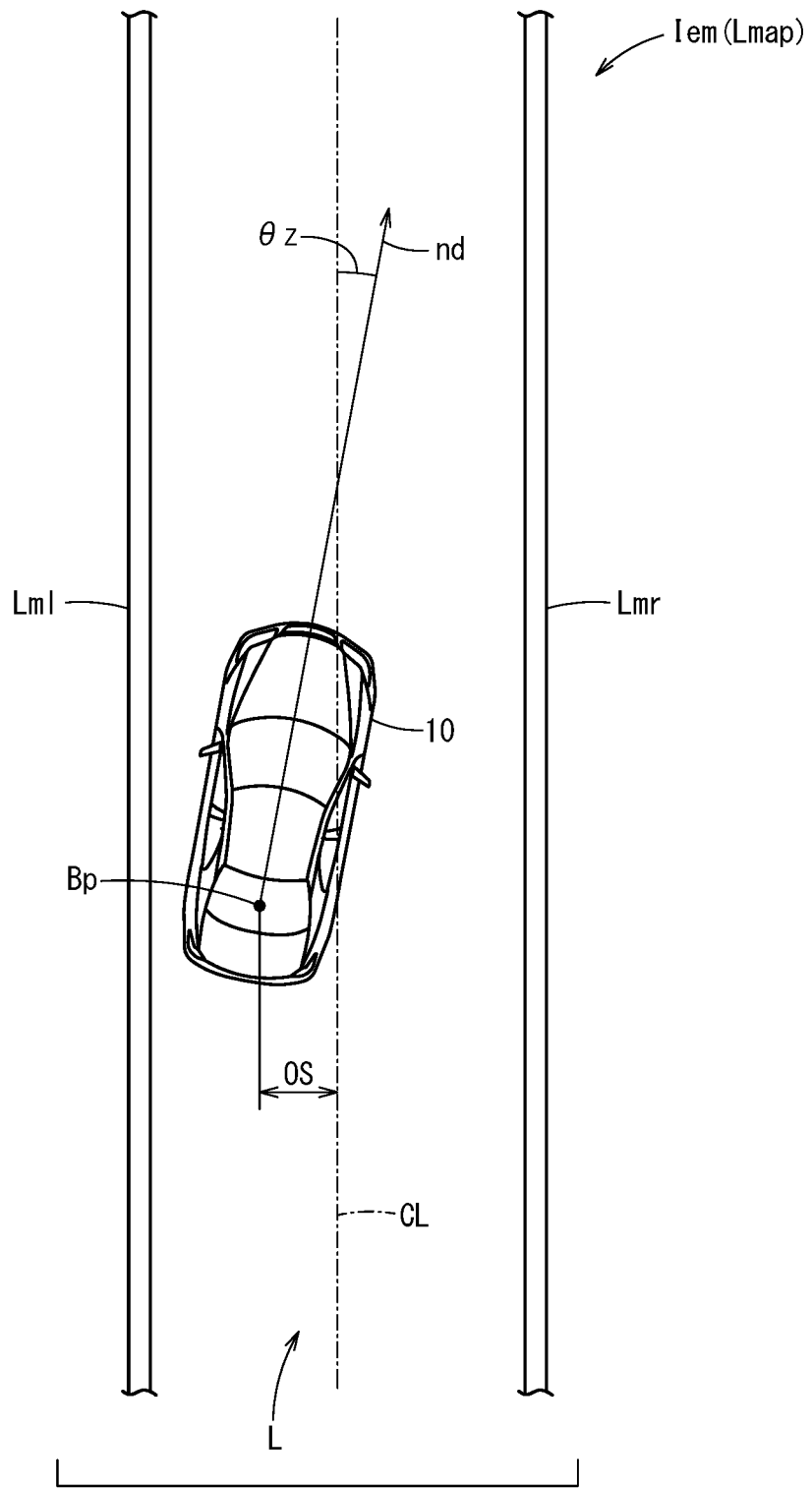
FIG. 3 is an exemplary illustration of a local environment map.

FIG. 3 shows an example of a local environment map Lmap that is stored as the local environment map information Iem.

In this instance, the host vehicle state information Ivh is information obtained from the vehicle control unit 110, and is basically made up from an offset amount (position) OS of a reference point Bp of the vehicle 10, for example, a midpoint of a rear wheel axle from a center line CL of the lane L (which is partitioned by a right side lane marking Lmr and a left side lane marking Lml), a posture angle (also referred to as an azimuth angle) θz which is an angle between the center line CL and a nose direction nd of the vehicle 10, a speed vs, an acceleration va, a curvature ρ of the travel line, a yaw rate γ, and a steering angle δst, etc. The offset amount OS may be expressed as coordinates {x (a longitudinal direction which is the direction of the travel path), y (a lateral direction which is a direction perpendicular to the travel path)} from a reference position (arbitrary).

More specifically, as shown in the following equation (1), the host vehicle state information Ivh is the most recent information at that point in time of a later-described trajectory point sequence Pj {refer to equation (2)}.

$$Ivh = Ivh(x, y, \theta z, vs, va, \rho, \gamma, \delta st) \quad (1)$$

$$Pj = Pj(x, y, \theta z, vs, va, \rho, \gamma, \delta st), t = 1, 2, \ldots T \quad (2)$$

The trajectory point sequence Pj is corrected until later-described trajectory point sequence candidates Pcj(x, y, θz, vs, va, ρ, γ, δst) t=1, 2, . . . T are affirmatively evaluated, to result in the trajectory point sequence Pj(x, y, θz, vs, va, ρ, γ, δst) t=1, 2, . . . T which is an output trajectory. The term "t" corresponds to the time of an integer fraction (which may be changed depending on the speed vs) of the operation cycle Toc, with 1 being a first point, and T corresponding to the length of time of the trajectory that is generated at a point of one second or the like.

In FIG. 3, the lane L (the right lane marking Lmr and the left lane marking Lml) is the external environment recognition information Ipr that is recognized (using a known type of lane marking detection, a bird's-eye transformation, and a curve approximation process) by the external environment recognition unit 51 from the image information from the cameras 33.

In this manner, the local environment map information Iem (local environment map Lmap) is information indicative of the surrounding situation (situation around the periphery of the host vehicle) of the road (lane markings Lm) with the vehicle position in the direction in which the host vehicle 10 is traveling serving as a reference, which is generated by combining the host vehicle state information Ivh and the external environment recognition information Ipr.

Moreover, in the local environment map generating unit 54, for example, in the case of a straight lane, the lane center line CL is generated as an optimum travel line, and in the case of a curved lane, a so-called out-in-out travel line with respect to the lane center line CL is generated as the optimum travel line. Such an optimum travel line is included in the local environment map information Iem (local environment map Lmap).

Returning to FIG. 2, in response to an operation command Ac from the integrated control unit 70, the long-term trajectory generating unit 71 refers to the local environment map information Iem including the static external environment recognition information Iprs from which the dynamic external environmental information Iprd is excluded, the host vehicle state information Ivh, and a road map (curvatures of curbsides and the like) which is stored in the map information storage unit 42, generates a long-term trajectory Lt, for example, with an operation cycle of 9×Toc, and outputs the generated long-term trajectory Lt to the integrated control unit 70 together with the count value of the update counter. The long-term trajectory Lt is stored as trajectory information It in a trajectory information storage unit 48 of the storage device 40.

More specifically, the long-term trajectory generating unit 71 generates a long-term trajectory (also referred to as a 10-sec trajectory) corresponding to a relatively long time period (long distance), for example, a travel time on the order of 10 seconds, which is a trajectory for the purpose of carrying out a vehicle control in which emphasis is placed on riding comfort and comfortability of the vehicle 10 (in which rapid steering and rapid acceleration/deceleration are not performed), and for example, corresponds to a trajectory that is driven by a model driver who is skilled at driving, and which uses the static external environment recognition information Iprs without using the dynamic external environment recognition information Iprd, and in which the operation cycle is of a relatively long period taking place, for example, over a long period Tl (Tl=9×Toc) on the order of several hundred ms.

In response to an operation command Ad from the integrated control unit 70, the medium-term trajectory generating unit 72 refers to the local environment map information Iem (including the dynamic external environment recognition information Iprd and the static external environment recognition information Iprs), the host vehicle state information Ivh, and the long-term trajectory Lt, generates a medium-term trajectory Mt with an operation cycle of 3× Toc, and outputs the generated medium-term trajectory Mt to the integrated control unit 70 together with the count value of the update counter. The medium-term trajectory Mt is stored as trajectory information It in the trajectory information storage unit 48.

For example, in the case that the external environment recognition unit 51 has discovered an obstacle (included in the dynamic external environment recognition information Iprd) such as a parked vehicle or the like in a frontward direction of the lane L, the medium-term trajectory generating unit 72 generates the medium-term trajectory Mt (also referred to as a 5-sec trajectory) corresponding to a relatively short time period (short distance), for example, a travel time on the order of several seconds, which is a trajectory (in the case of multiple lanes on one side, a trajectory including a lane change if necessary) for bypassing the parked vehicle or the like, and in which the operation cycle is of a relatively shorter period than the long period Tl taking place, for example, over a medium period Tm (Tm=3×Toc) on the order of one hundred and several tens of ms.

When the medium-term trajectory Mt is generated, in the case that the dynamic environment recognition information Iprd is not included within the local environment map information Iem, as a result, the medium-term trajectory Mt substantially coincides with the long-term trajectory Lt.

In response to an operation command Ae from the integrated control unit 70, the short-term trajectory generating unit 73 refers to the medium-term trajectory Mt that was generated with reference to the local environment map information Iem (including the dynamic external environment recognition information Iprd and the static external environment recognition information Iprs), the host vehicle state information Ivh, and the long-term trajectory Lt, generates a short-term trajectory St corresponding to the vehicle dynamics of the host vehicle 10 and with the shortest operation cycle Toc from among the three trajectory generating units, and together with the count value of the update counter, outputs the generated short-term trajectory St to the integrated control unit 70, and simultaneously outputs the same to the vehicle control unit 110.

The vehicle control unit 110 controls the actuators 27 on the basis of the short-term trajectory St. The short-term trajectory St is stored as trajectory information It in the trajectory information storage unit 48.

When the short-term trajectory St is generated, in the case that the dynamic environment recognition information Iprd is not included within the local environment map information Iem, as a result, the short-term trajectory St substantially coincides with the medium-term trajectory Mt that was generated with reference to the long-term trajectory Lt.

In this manner, the short-term trajectory generating unit 73 generates the short-term trajectory (referred to as a 1-sec trajectory) St corresponding to a relatively short time period (short distance) to be traveled henceforth, for example, a travel time on the order of one second, in which the operation cycle is of a relatively shorter period than the long period Tl and the medium period Tm, and takes place, for example, over a short period Ts (Ts=Toc) on the order of several tens of ms.

As the short-term trajectory St, for each short period Ts, there is generated a trajectory point sequence Pj(x, y, θz, vs, va, δst) as vehicle command values, generally on the basis of the position x in the longitudinal direction along the center line CL of the lane markings, the position y in the lateral direction, the posture angle θz, the speed vs, the acceleration va, and the steering angle Est (the steering angle δ of the vehicle 10 can be calculated in consideration of a gear ratio to the steering angle δst of the steering wheel), etc., {refer to the above-described equation (2)}.

In practice, before a final trajectory point sequence Pj is generated, a plurality of trajectory point sequence candidates Pcj (operation cycle: about Toc/5) are generated by the short-term trajectory generating unit 73 in each of the short periods Ts (Ts=Toc). As will be described later, concerning the generated trajectory point sequence candidates Pcj, within the same short period Ts, the trajectories are further evaluated by the short-term trajectory generating unit 73 on the basis of the vehicle dynamics, and thereafter, according to the evaluation results, corrections are made if necessary, and the trajectory point sequence Pj is generated as the output trajectory of the short-term trajectory St.

The vehicle control unit 110 converts the trajectory point sequence Pj into the vehicle control values Cvh, and outputs the values to the driving force device 28, the steering device 30, and the braking device 32, in a manner so that the vehicle 10 travels along the input short-term trajectory St, and more specifically, along the trajectory point sequence Pj that was generated and input on the order of the operation cycle Toc/5.

Moreover, the set time lengths (also referred to as time trajectories) of the short-term trajectory St, the medium-term trajectory Mt, and the long-term trajectory Lt may be changed depending on the speed vs, the steering angle St, the curvature p of the travel line, the road gradient, and the like. For example, the short-term trajectory St may be changed within a range of 0.2 [s] to 2 [s], the medium-term trajectory Mt may be changed within a range of 2 [s] to 7 [s], and the long-term trajectory Mt may be changed within a range of 7 [s] to 15 [s].

[Description of Operations of the Embodiment]
[Description According to the Flowchart]

Figure 4:
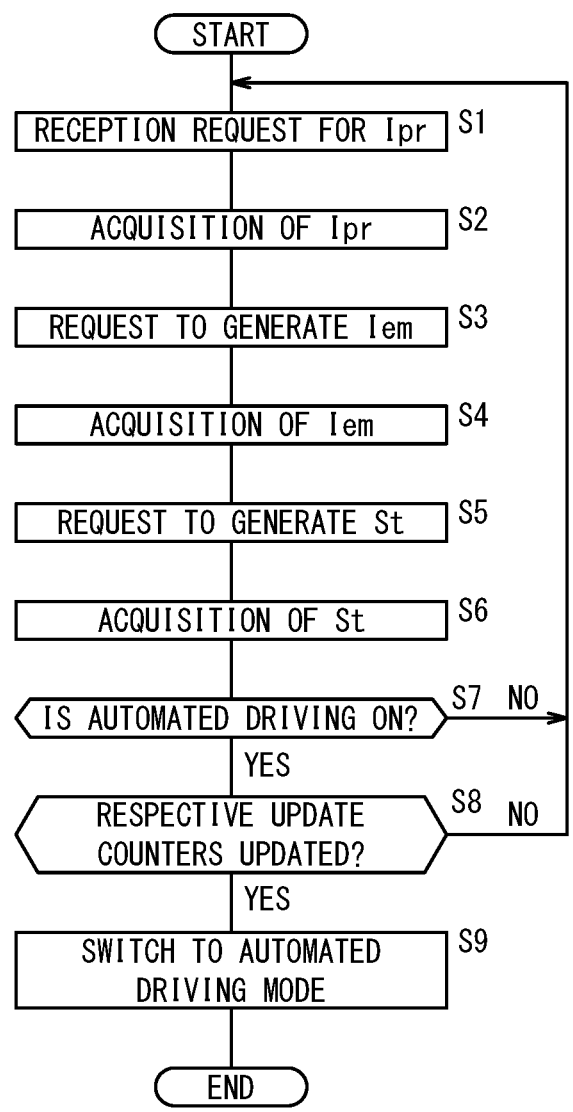
FIG. 4 is a flowchart provided to explain operations of the vehicle control device.

Operations of the vehicle control device 12, which is basically configured in the manner described above, will be described in detail with reference to the flowchart of FIG. 4. The execution subject of the program according to the flowchart is the integrated control unit 70 of the vehicle control device 12.

In step S1, the integrated control unit 70 transmits with respect to the recognition result receiving unit 52 the operation command Aa to request reception of the external environment recognition information Ipr.

In this case, in a time period that is less than the operation cycle Toc, and on the basis of the external environmental information (image information) from the cameras 33 from among the external environment sensors 14, the external environment recognition unit 51 recognizes the lane markings Lm (Lmr, Lml) on both sides (right and left sides) of the vehicle 10, and together therewith, generates the static external environment recognition information Iprs of features such as the position up to a stop line of an intersection or the like, and the travel capable region (a region in which guardrails and curbsides are excluded), etc., and transmits the information to the recognition result receiving unit 52.

Simultaneously, on the basis of the external environmental information from the cameras 33, the radar devices 34, and the non-illustrated LIDAR devices or the like, the external environment recognition unit 51 generates the dynamic external environment recognition information Iprd of features such as obstacles (including parked or stopped vehicles), traffic participants (people, other vehicles), and the colors of traffic signals, etc., and transmits the information to the recognition result receiving unit 52.

Therefore, in step S2, the static external environment recognition information Iprs (for example, mainly road partition lines such as lane markings, stop lines, and curbsides) and the dynamic external environment recognition information Iprd (for example, mainly colors of traffic signals, and traffic participants) are acquired in synchronism with the operation command Aa as the external environment recognition information Ipr by the integrated control unit 70 through the recognition result receiving unit 52 together with the count value of the update counter, and such information is stored in the storage device 40.

In step S3, in synchronism with the next operation cycle Toc, the integrated control unit 70 transmits with respect to the local environment map generating unit 54 the external environment recognition information Ipr and the host vehicle state information Ivh, and together therewith, transmits the operation command Ab to request generation of the local environment map information Iem.

In synchronism with the operation command Ab, and within the operation cycle Toc, the local environment map generating unit 54 combines (merges) the vehicle state information Ivh with the external environment recognition information Ipr, generates the local environment map information Iem including the local environment map Lmap shown in FIG. 3, and transmits the generated local environment map information Iem together with the updated count value of the update counter to the integrated control unit 70.

Consequently, in step S4, the integrated control unit 70 acquires the local environment map information Iem, and stores the local environment map information Iem in the storage device 40.

Next, in step S5, in synchronism with the next operation cycle Toc, the integrated control unit 70 transmits with respect to the short-term trajectory generating unit 73 the external environment recognition information Ipr, the host vehicle state information Ivh, and the local environment map information Iem, and together therewith, transmits the operation command Ae to request generation of the short-term trajectory St.

In synchronism with the operation command Ae, the short-term trajectory generating unit 73 sets to an initial value (initial position) the previously output short-term trajectory St, and based on the initial value (initial position), with reference to the vehicle state information Ivh and the local environment map information Iem, generates the plurality of trajectory point sequence candidates Pcj including a nose direction (longitudinal direction x) nd at each 1/5 of the operation cycle Toc (the operation cycle Toc divided by 5), and position coordinates (x, y) of the reference point Bp (FIG. 3) of the vehicle 10 in a direction (lateral direction y) perpendicular to the nose direction nd.

The short-term trajectory generating unit 73, while taking into consideration the vehicle dynamics in light of the local environment map information Iem, evaluates whether the trajectories of the generated trajectory point sequence candidates Pcj, for example, are capable of enabling passage through an intersection in the case that the light color of the traffic signal is green, or are capable of enabling stopping at a stop line before reaching the intersection in the case that the light color of the traffic signal is red, or the like, corrects the trajectory point sequence candidates Pcj until the evaluation result thereof becomes an affirmative evaluation, and generates the trajectory point sequence which is the output trajectory. The generated trajectory point sequence Pj is transmitted to the integrated control unit 70 and the vehicle control unit 110.

The vehicle control unit 110 converts the trajectory point sequence Pj into the vehicle control values Cvh and transmits them to the actuators 27 (the driving force device 28, the steering device 30, and the braking device 32).

In step S6, the short-term trajectory St made up from the trajectory point sequence Pj, and the updated count value of the update counter are acquired by the integrated control unit 70, and are stored as trajectory information It in the trajectory information storage unit 48, and together therewith, the count value is stored in an update counter storage unit 49.

Next, in step S7, the integrated control unit 70 determines whether or not the automated driving switch 22 is set to an on-state automated driving mode.

In the case that the automated driving switch 22 is set to an off-state non-automated driving mode (step S7: NO), the process of generating the short-term trajectory St of step S1 and thereafter is repeated.

In the case that the automated driving switch 22 is set to the on-state automated driving mode (step S7: YES), then in step S8, it is confirmed whether or not the count values of the respective update counters have been updated, and in the case of not being updated (in the case of a deviation in time), the process returns to step S1, whereas in the case of being updated, then in step S9, a switch is instantly made to the automated driving mode in step S9 {also referred to as transitioning (switching over) from the non-automated driving mode to the automated driving mode}.

[Description in Accordance with the Time Charts]

Next, with reference to the time charts of FIG. 5 (1/3), FIG. 6 (2/3), and FIG. 7 (3/3), an operation of transitioning from the non-automated driving mode to the automated driving mode, and operations of the vehicle control device 12 in the automated driving mode will be described.

Figure 5:
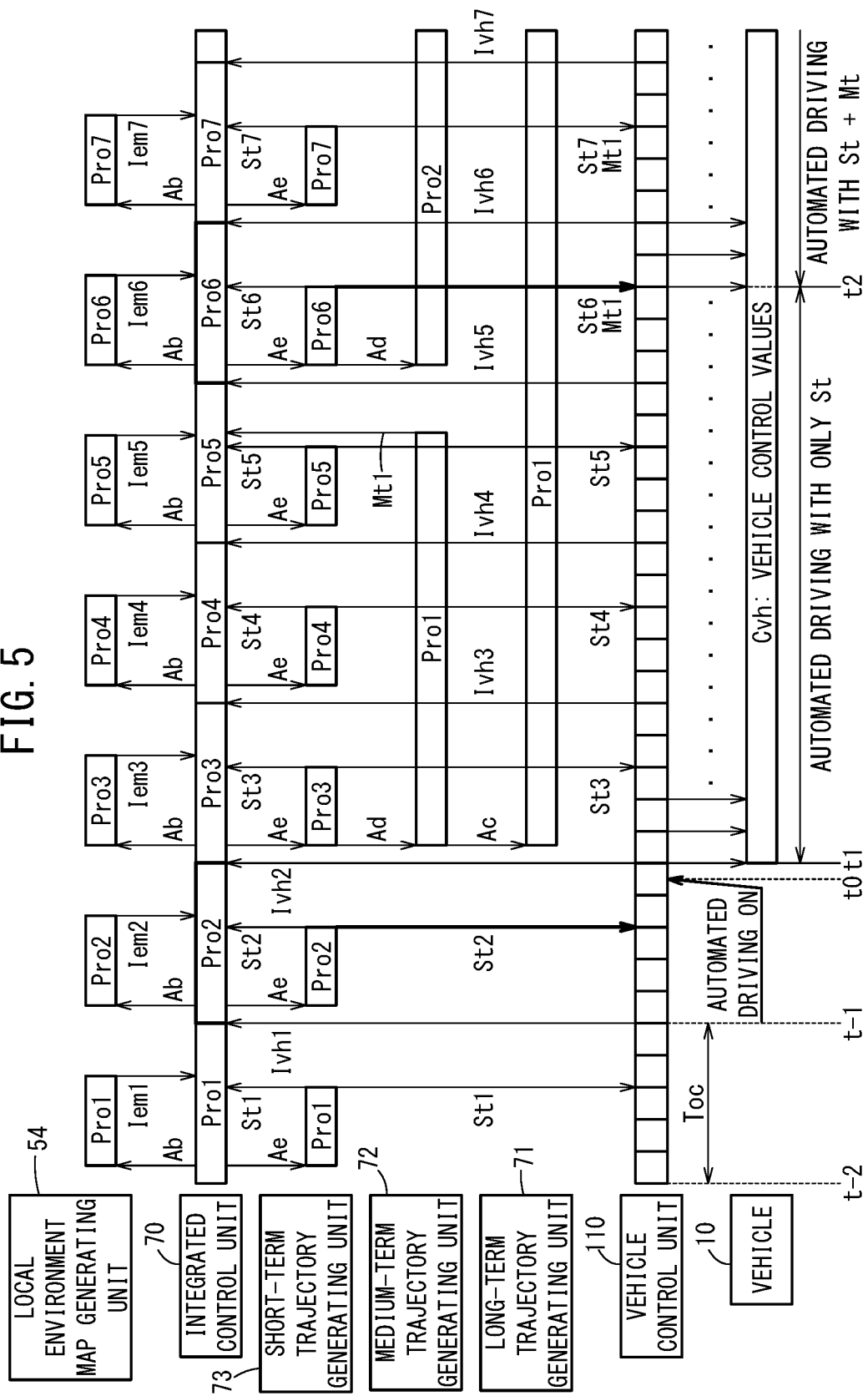
FIG. 5 is a time chart (one of three) provided to explain operations of the vehicle control device according to the present embodiment.

In FIG. 5, at time t0, the manual driving mode (automated driving OFF state) is switched to the automated driving mode (automated driving ON state) by an operation of the automated driving switch 22 made by the driver or the like.

At time t-2 prior to time t0 (a point in time at the leftmost end in FIG. 5), the integrated control unit 70, in the vicinity of initiation of a process Pro1 corresponding to the operation cycle Toc, simultaneously transmits to the recognition result receiving unit 52 (see FIGS. 1 and 2) the operation command Aa (not shown in FIG. 5) to request reception of the external environment recognition information Ipr, and to the local environment map generating unit 54 the operation command Ab to request generation of the local environment map information Iem (corresponding to step S3), and together therewith, simultaneously transmits with respect to the short-term trajectory generating unit 73 the operation command Ae to request generation of the short-term trajectory St (corresponding to step S5).

In response to the operation command Ae, the short-term trajectory generating unit 73 generates a short-term trajectory St1 at a time within the operation cycle Toc, and outputs the generated short-term trajectory St1 to the integrated control unit 70 and the vehicle control unit 110.

Further, in response to the operation command Ab at time t-2, the local environment map generating unit 54 generates local environment map information Iem1 substantially at the time of the operation cycle Toc, and outputs the local environment map information Iem1 to the integrated control unit 70.

Moreover, since the local environment map information Iem1 is combined information of the external environment recognition information Ipr and the vehicle state information Ivh, before the process Pro1 of generating the local environment map information Iem is ended, in response to the operation command Aa, the external environment recognition information Ipr received from the external environment recognition unit 51 is transmitted via the integrated control unit 70 from the recognition result receiving unit 52 to the local environment map generating unit 54. However, due to lack of space on the drawing sheet, the processes of the operation command Aa and the external environment recognition information Ipr are omitted from illustration.

In practice, since at time t-2 the host vehicle state information Ivh1 does not yet exist, the local environment map information Iem2, which is created in consideration of the vehicle state information Ivh1, is generated by the process Pro2 at time t-1 of the local environment map generating unit 54. At time t-1 and thereafter, the local environment map information Iem is continuously generated.

At time t-1 at the end point of the process Pro1 of the integrated control unit 70, the vehicle control unit 110 transmits to the integrated control unit 70 the vehicle state information Ivh1 corresponding to the short-term trajectory St1 received at the end point of the process Pro1 of the short-term trajectory generating unit 73.

In the process Pro2 corresponding to the next operation cycle Toc, in the manner described above, the short-term trajectory St2, the local environment map information Iem2, and the vehicle state information Ivh2 are generated in response to the operation commands Ab and Ae.

At time t0 before time t1 at which the process Pro2 of the integrated control unit 70 is ended, it is assumed that the automated driving switch 22 has been operated to the ON state (step S7: YES).

In this case, at the starting time t1 of the process Pro3 of the next operation cycle Toc, the actuators 27 (the driving force device 28, the steering device 30, and the braking device 32) are controlled by the vehicle control unit 110, and implement automated driving on the basis of the vehicle control values Cvh generated only by the short-term trajectory St2.

In addition, in response to the automated driving switch 22 being placed in the ON state, in the vicinity of a point in time when the process Pro3 by the integrated control unit 70 is started, the operation commands Ae, Ad, and Ac to request generation of the short-term trajectory St3, the medium-term trajectory Mt1, and the long-term trajectory Lt1 (see FIG. 6) are transmitted respectively from the integrated control unit 70 to the short-term trajectory generating unit 73, the medium-term trajectory generating unit 72, and the long-term trajectory generating unit 71.

Moreover, it should be noted that, in the vicinity of the point in time when the process Pro3 of the integrated control unit 70 is started, the operation command Ae to request generation of the short-term trajectory St from the integrated control unit 70 with respect to the short-term trajectory generating unit 73 is continually (continuously) transmitted, and more specifically, the short-term trajectory St is continuously generated from a point in time prior to the start of automated driving.

By doing so, during the process Pro5 (of the integrated control unit 70) when the operation cycle Toc has elapsed roughly three times, the medium-term trajectory Mt1 of the process Pro1 (of the medium-term trajectory generating unit 72) is generated, and is transmitted via the integrated control unit 70 to the short-term trajectory generating unit 73.

In this case, in the process Pro6 (of the integrated control unit 70) during the next operation cycle Toc, normally the short-term trajectory St6 is generated in which the travel line of the vehicle 10 becomes smoother in consideration of the medium-term trajectory Mt1 of the 5-sec trajectory.

Moreover, having taken into consideration the medium-term trajectory Mt1, when the short-term trajectory generating unit 73 generates the short-term trajectory St4, the surrounding environment is considered on the basis of the speed vs, the acceleration va, the yaw rate γ, and the steering angle Est at the current position of the host vehicle 10, and a plurality of trajectory point sequence candidates Pcj for selection of the short-term trajectory St6 are generated from the current position (starting point) of the host vehicle 10 to a target point (end point) after 1 [sec].

Additionally, this implies that the respective trajectory point sequence candidates Pcj for the generated short-term trajectory St6 are evaluated on the basis of a later-described evaluation function with respect to the trajectory point sequence Pj of the medium-term trajectory Mt1, together with being evaluated on the basis of a later-described other evaluation function with respect to the local environment map Lmap of the local environment map information Iem5 that is generated by the process Pro5 (of the local environment map generating unit 54), the trajectory point sequence candidate Pcj with a high evaluation is selected, and the short-term trajectory St6 is generated in which the selected trajectory point sequence candidate Pcj is taken as the trajectory point sequence Pj.

The trajectory point sequence Pj of the short-term trajectory St6 is converted through the vehicle control unit 110 into the vehicle control values Cvh at a period of the operation cycle Toc=5, and is output to the actuators 27 to thereby perform automated driving (in FIG. 5, the interval which is marked "automated driving with St+Mt").

In this case, in the evaluation function of the trajectory point sequence Pj of the medium-term trajectory Mt1, the evaluation is set so as to become higher as the deviation (deviation concerning the vehicle control values Cvh) of the respective elements (position x,y, speed vs, steering angle δst) at points corresponding to the respective trajectory point sequence candidates Pcj of the short term trajectory St6 and the trajectory point sequence Pj of the medium-term trajectory Mt1 is smaller. Further, in the evaluation function with respect to the local environment map Lmap (the lane L and the optimum travel line of the host vehicle 10 generated from the vehicle state information Ivh and the external environment recognition information Ipr, for example, a lane center line in the case of a straight lane, and an out-in-out travel line in the case of a curved lane), the evaluation is set so as to become higher as the deviation (positional deviation in relation to the lane) between the positions x,y of the respective trajectory point candidates Pcj of the short term trajectory St6 and the optimum travel line, etc., of the local environment map Lmap is smaller. The trajectory point sequence candidate Pcj having the highest weighted sum of the evaluation values of both evaluation functions is set as the trajectory point sequence Pj of the short-term trajectory St6.

Next, during the process Pro11 by the integrated control unit 70 when the operation cycle Toc has elapsed roughly nine times from the starting time t1 of automated driving, the long-term trajectory Lt1 is generated in the process Pro1 of the long-term trajectory generating unit 71, and in the process Pro15 (of the integrated control unit 70) during the operation period Toc, in consideration of the long-term trajectory Lt1 of the 10-sec trajectory, and the medium-term trajectory Mt3 of the 5-sec trajectory, the short-term trajectory St15 of the vehicle 10 is generated in the process Pro15 of the short-term trajectory generating unit 73.

Moreover, the short term trajectory St15 having taken into consideration the long-term trajectory Lt1 and the medium-term trajectory Mt3 implies that, when the medium-term trajectory generating unit 72 generates the medium-term trajectory Mt4 in the process Pro4, similar to what was described with the generation process of the short-term trajectory St4, a plurality of candidates for the medium-term trajectory Mt4 made up from a plurality of trajectory point sequence candidates Pcj are generated, the generated respective trajectory point sequence candidates Pcj are evaluated on the basis of evaluation functions of the trajectory point sequence Pj of the long-term trajectory Lt1 that was generated in the process Pro1 (of the long-term trajectory generating unit 71), and the local environment map Lmap of the local environment map information Iem that was generated in the process Pro11 (of the local environment map generating unit 54), and the trajectory point sequence candidate Pcj for which the evaluation thereof is high is set as the trajectory point sequence Pj of the medium-term trajectory Mt4 (see FIG. 6).

Furthermore, in this manner, the implication is that the medium-term trajectory Mt4 generated with reference to the long-term trajectory Lt1, and the plurality of candidates for the short-term trajectory St15 are evaluated by the evaluation functions as described above, whereby the short-term trajectory St15 is generated with reference to the medium-term trajectory Mt4 that was generated with reference to the long-term trajectory Lt1 (see FIG. 7).

At time t3 in FIG. 7 and thereafter, in the interval that is marked "automated driving with St+Mt+Lt", automated driving is executed in which the riding comfort is considered sufficiently close to the driving sensation of the driver.

[Time Charts of Comparative Example]

In the time charts of FIG. 8 (1/3), FIG. 9 (2/3), and FIG. 10 (3/3), an operation of transitioning from the non-automated driving mode to the automated driving mode, and operations of the vehicle control device 12 in the automated driving mode will be described in accordance with a comparative example.

The time points, symbols, and expressions noted in the time charts of FIGS. 8 to 10 are the same as the time points, symbols, and expressions appearing in the time charts of FIGS. 5 to 7, and therefore, detailed description of such features is omitted.

In the operations according to the comparative example, the long-term trajectory Lt1 (see FIG. 9) is generated by the process Pro1 (of the long-term trajectory generating unit 71), on the basis of a request to generate the long-term trajectory Lt by the operation command Ac at time t0 when the automated driving mode is initiated with the automated driving switch 22 being placed in an ON state. Thereafter, a medium-term trajectory Mt4 (see FIGS. 9 and 10) is generated by the process Pro1 (of the medium-term trajectory generating unit 72).

Thereafter, at time t3 (see FIG. 10), "automated driving by St+Mt+Lt" is initiated.

[Description in Accordance with Reduced Scale Time Charts of the Embodiment and the Comparative Example]

FIG. 11 shows a time chart according to the embodiment in which FIGS. 5 to 7 are drawn collectively, and FIG. 12 shows a time chart according to the comparative example in which FIGS. 8 to 10 are drawn collectively.

In the vehicle 10 according to the present embodiment, since the vehicle control values Cvh are generated by the vehicle control unit 110 at time t1 immediately after it being less than the operation cycle Toc from the automated driving switch 22 being placed in the ON state at time to, it is possible for automated driving to be initiated from time t1. However, with the vehicle 10 according to the comparative example, automated driving is initiated after a time (time delay) Tγ (Tγ~Toc×15, see FIG. 12) from the automated driving switch 22 being placed in the ON state at time t1.

In this manner, in comparison with the present embodiment, with the vehicle 10 according to the comparative example, from time t0 at which the automated driving switch 22 is placed in the ON state, the delay time Tr until the vehicle control values Cvh are transmitted from the vehicle control unit 110 is delayed by roughly the operation cycle Toc×13 (delay time), and then automated driving is initiated.

In contrast thereto, with the vehicle 10 according to the present embodiment, immediately after time t0 when the automated driving switch 22 is placed in the ON state, at a maximum, automated driving is initiated within the operation cycle Toc from time t0 when the automated driving switch 22 is placed in the ON state.

[Summary]

As has been described above, according to the aforementioned embodiment, the vehicle control device 12 that controls the vehicle 10 configured to be driven automatically, comprises the long-term trajectory generating unit 71 configured to generate, on the basis of the external environmental information Ipr, the long-term trajectory Lt (of a relatively long time period) having the long period Tl (Tl=Toc× 9) whose operation cycle is relatively long, the short-term trajectory generating unit 73 configured to generate the short-term trajectory St in consideration of the generated long-term trajectory Lt, and having a short period Ts (Ts=Toc) which is shorter than the long period Tl (Tl=Toc× 9), the automated driving switch 22 which serves as an automated driving ON setting unit that sets automated driving to an ON state, and the integrated control unit 70 that controls these elements.

In this case, when the automated driving ON state is set by the automated driving switch 22, the integrated control unit 70 is simultaneously configured to initiate generation of trajectories in the long-term trajectory generating unit 71 and the short-term trajectory generating unit 73 (time t1), while configured to control the vehicle 10 in accordance with at least the short-term trajectory St, before the long-term trajectory Lt is generated (in the interval before time t1 to time t3).

In this manner, when automated driving is set to the ON state, since the vehicle 10 is controlled in accordance with at least the short-term trajectory St before the long-term trajectory Lt is generated, when the automated driving switch 22 is placed in the ON state, the vehicle 10 can be immediately controlled. In addition, since generation of the trajectories is simultaneously initiated in the long-term trajectory generating unit 71 and the short-term trajectory generating unit 73, the time until the lower order short-term trajectory St is generated in consideration of the higher order long-term trajectory Lt is not increased in length.

In general, in the long-term trajectory Lt, emphasis is placed on riding comfort, whereas in the short-term trajectory St, emphasis is placed on adaptability and responsiveness with respect to the environment.

In the vehicle 10 equipped with the vehicle control device 12 according to the present embodiment, when automated driving is set to the ON state, it is possible to immediately initiate automated driving in which responsiveness to the colors of traffic signals and environmental conditions such as traffic participants and the like is secured, while after the elapse of a predetermined period, automated driving can be performed in further consideration of riding comfort.

In this case, the external environment recognition information Ipr includes the static external environment recognition information Iprs whose state does not change, and the dynamic external environment recognition information Iprd whose state changes, the long-term trajectory generating unit 71 is configured to generate the long-term trajectory Lt using the static external environment recognition information Iprs, and the short-term trajectory generating unit 73 is configured to generate the short-term trajectory St using the static external environment recognition information Iprs and the dynamic external environment recognition information Iprd.

In this case, since the lower order short-term trajectory generating unit 73 generates the short-term trajectory St using the static external environment recognition information Iprs whose state does not change and the dynamic external environment recognition information Iprd whose state changes, the vehicle 10 can immediately be driven automatically while adaptability and responsiveness are taken into consideration.

In addition, after the long-term trajectory Lt has been generated by the higher order long-term trajectory generating unit 71 with reference to the road map (including curves and the like in front of the vehicle 10 which cannot be acquired from the external environment sensors 14) that is stored in the map information storage unit 42, etc., the short-term trajectory St is generated by the short-term trajectory generating unit 73 in consideration of the long-term trajectory Lt.

Therefore, the vehicle 10 can be immediately controlled on the basis of the short-term trajectory St which is based on the dynamic external environment recognition information Iprd, and after the long-term trajectory Lt is generated on the basis of the static external environment recognition information Iprs, it is possible to perform automated driving in which the occurrence of abrupt vehicle behaviors is suppressed, and in which riding comfort and comfortability are taken into consideration.

Moreover, with respect to the short-term trajectory generating unit 73, after the long-term trajectory Lt is generated, when a final short-term trajectory St is generated, the integrated control unit 70 compares and evaluates a plurality of candidates for the short-term trajectory St with the medium-term trajectory Mt that was generated with reference to the long-term trajectory Lt, and by performing a control so as to set to the short-term trajectory St the candidate for which the evaluation thereof is high, after the long-term trajectory Lt is generated, automated driving can be performed in which riding comfort is considered in addition to responsiveness with respect to the environment.

In the above-described embodiment, in addition to the short-term trajectory generating unit 73, the medium-term trajectory generating unit 72 is provided, and configured to generate the medium-term trajectory having a medium period Tm (Tm=Toc×3) that is relatively longer than the short period Ts (Ts=Toc) and relatively shorter than the long period Tl (Tl=Toc×9).

In addition, when automated driving is set to the ON state, the integrated control unit 70 is simultaneously configured to initiate generation of respective trajectories in the long-term trajectory generating unit 71, the short-term trajectory generating unit 73, and the medium-term trajectory generating unit 72, while configured to control the vehicle 10 in accordance with the short-term trajectory St before the medium-term trajectory Mt is generated, and when the medium-term trajectory Mt is generated, configured to control the vehicle 10 in accordance with the short-term trajectory St with reference to the medium-term trajectory Mt, and when the long-term trajectory Lt is generated, configured to generate the short-term trajectory St with reference to the medium-term trajectory Mt that was generated with reference to the long-term trajectory Lt, and configured to control the vehicle 10 in accordance therewith.

In this manner, when automated driving is set to the ON state, at first, the vehicle 10 is controlled in accordance with the short-term trajectory St that was generated by the short-term trajectory generating unit 73 for which the operation cycle thereof is the shortest operation cycle Toc, next, the vehicle 10 is controlled with the short-term trajectory St made with reference to the medium-term trajectory Mt that was generated by the medium-term trajectory generating unit 72 for which the operation cycle thereof is the next shortest operation cycle 3×Toc, and next, the vehicle 10 is controlled with the short-term trajectory St made with reference to the medium-term trajectory Mt that was generated with reference to the long-term trajectory Lt that was generated by the long-term trajectory generating unit 71 for which the operation cycle thereof is the longest operation cycle 9×Toc. Therefore, automated driving can be started immediately, and a transition can be made gradually in a stepwise manner to automated driving which is implemented in consideration of riding comfort and comfortability.

[Modifications]

The present invention is not limited to the embodiment described above, and it goes without saying that various configurations could be adopted therein based on the descriptive content of the present specification.

Modification 1: For example, a switching operation unit such as a button for switching between the process of the comparative example and the process of the embodiment may be provided, whereby a user such as the driver or the like can select between the processes.

Modification 2: Further, a vehicle control device having the same configuration as the vehicle control device 12 may also be provided in an external server (external vehicle control device), data of the vehicle control device 12 of the vehicle 10 may be retrieved through the communication device 20, and the vehicle 10 may be controlled based thereon. In this case, in the vehicle 10, within the vehicle control device 12, only the vehicle control unit 110 may be provided (the short-term trajectory St is transmitted from the server to the vehicle control unit 110), or may not be provided (the vehicle control values Cvh are transmitted from the server to the driving force device 28, etc.). Alternatively, the vehicle control device 12 may be eliminated from the vehicle 10, may be provided as a vehicle control device 12 in the external server, the server may be configured as a mirror (which is regularly updated so that the information stored in the storage device 40 is the same), and the vehicle control device 12 of the vehicle 10 may be backed up therein.

The invention claimed is:

1. A vehicle control device that controls a vehicle switchable between a manual driving mode and an automated driving mode, comprising:
   a long-term trajectory generating unit configured to generate, on a basis of external environmental information, a long-term trajectory having a long period whose operation cycle is relatively long;
   a short-term trajectory generating unit configured to generate a short-term trajectory having a short period which is shorter than the long period; and
   an integrated control unit configured to control the long-term trajectory generating unit and the short-term trajectory generating unit;
   wherein the integrated control unit is configured to control the short-term trajectory generating unit to generate the short-term trajectory in the manual driving mode and the automated driving mode, and
   when a switching command from the manual driving mode to the automated driving mode is input, the integrated control unit is configured to control the long-term trajectory generating unit to initiate generation of the long-term trajectory for simultaneous generation of trajectories in the long-term trajectory generating unit and the short-term trajectory generating unit, while the integrated control unit is configured to control the vehicle in accordance with the short-term trajectory including the short-term trajectory generated prior to the switching command until the long-term trajectory is generated, and control the vehicle in accordance with the short-term trajectory generated in consideration of the generated long-term trajectory after the long-term trajectory is generated.

2. The vehicle control device according to claim 1, wherein:
   the external environment recognition information includes static information whose state does not change, and dynamic information whose state changes;
   the long-term trajectory generating unit is configured to generate the long-term trajectory using the static information; and
   the short-term trajectory generating unit is configured to generate the short-term trajectory using the static information and the dynamic information.

3. The vehicle control device according to claim 2, wherein the long-term trajectory is a trajectory in which emphasis is placed on riding comfort, and the short-term trajectory is a trajectory in which emphasis is placed on responsiveness with respect to the external environment.

4. The vehicle control device according to claim 1, wherein:
   the short-term trajectory generating unit, in addition to the short-term trajectory generating unit, is divided into a medium-term trajectory generating unit configured to generate a medium-term trajectory having a medium period that is relatively longer than the short period and relatively shorter than the long period; and
   when performing automated driving, the integrated control unit is simultaneously configured to initiate generation of respective trajectories in the long-term trajectory generating unit, the short-term trajectory generating unit, and the medium-term trajectory generating unit, while configured to control the vehicle in accordance with the short-term trajectory before the medium-term trajectory is generated, and when the medium-term trajectory is generated, configured to control the vehicle in accordance with the short-term trajectory with reference to the medium-term trajectory, and when the long-term trajectory is generated, configured to generate the short-term trajectory with reference to the medium-term trajectory that was generated with reference to the long-term trajectory, and configured to control the vehicle in accordance with the short-term trajectory.

* * * * *